(12) United States Patent
Lai et al.

(10) Patent No.: US 10,383,152 B2
(45) Date of Patent: Aug. 13, 2019

(54) RANDOM ACCESS PROCEDURE FOR MACHINE TYPE COMMUNICATION

(71) Applicant: Lenovo Innovations Limited (Hong Kong), Hong Kong (CN)

(72) Inventors: Xuefeng Lai, Beijing (CN); Tong Li, Beijing (CN); Zukang Shen, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/755,453

(22) PCT Filed: Aug. 25, 2015

(86) PCT No.: PCT/CN2015/087974
§ 371 (c)(1),
(2) Date: Feb. 26, 2018

(87) PCT Pub. No.: WO2017/031676
PCT Pub. Date: Mar. 2, 2017

(65) Prior Publication Data
US 2019/0098667 A1    Mar. 28, 2019

(51) Int. Cl.
*H04W 74/08* (2009.01)
*H04W 72/12* (2009.01)
(Continued)

(52) U.S. Cl.
CPC ......... *H04W 74/0833* (2013.01); *H04W 4/70* (2018.02); *H04W 72/121* (2013.01); *H04W 72/14* (2013.01)

(58) Field of Classification Search
CPC .......... H04W 74/0833; H04W 72/121; H04W 72/14; H04W 4/70; H04W 80/04;
(Continued)

(56) References Cited

U.S. PATENT DOCUMENTS 8,761,109 B2   6/2014 Nory et al.
9,271,183 B1 * 2/2016 Oroskar ................ H04W 74/06
(Continued)

FOREIGN PATENT DOCUMENTS

CN        103546986 A    1/2014
CN        103747534 A    4/2014
WO     2009/022837 A1    2/2009

*Primary Examiner* — Brenda H Pham
(74) *Attorney, Agent, or Firm* — Kunzler Bean & Adamson

(57) ABSTRACT

Apparatuses, methods, and systems are disclosed for alleviating congestion during random access of enhanced machine-type communications user equipment. One apparatus includes a radio transceiver that communicates over a mobile telecommunications network and a processor configured to: transmit a physical random access channel (PRACH) preamble on a first time-frequency resource, monitor a second time-frequency resource for a first downlink (DL) grant scheduling a random access response (RAR) corresponding to the transmitted PRACH preamble on a third time-frequency resource, receive the RAR on the third time-frequency resource, transmit a message on a fourth time-frequency resource, wherein the fourth time-frequency resource is determined based on the RAR; determine a fifth time-frequency resource based on a time-frequency resource index, wherein the RAR includes the time-frequency resource index, and monitor the fifth time-frequency resource for a second DL grant scheduling a contention resolution message.

20 Claims, 8 Drawing Sheets

(51) Int. Cl.
*H04W 72/14* (2009.01)
*H04W 4/70* (2018.01)

(58) Field of Classification Search
CPC ..... H04W 84/12; H04W 88/06; H04W 88/08; H04W 84/18; H04W 74/08; H04W 74/0816; H04W 74/04; H04W 72/0406; H04B 7/2123; H04B 7/212
USPC ..... 370/322, 330, 310.2, 328, 338, 341, 348
See application file for complete search history.

(56) References Cited

U.S. PATENT DOCUMENTS

| | | | |
|---|---|---|---|
| 9,907,095 B2* | 2/2018 | Han | H04W 74/0833 |
| 2013/0083753 A1* | 4/2013 | Lee | H04W 72/0453 |
| | | | 370/329 |
| 2013/0250925 A1* | 9/2013 | Lohr | H04W 72/0446 |
| | | | 370/336 |
| 2014/0079011 A1* | 3/2014 | Wiberg | H04W 74/006 |
| | | | 370/329 |
| 2014/0086213 A1* | 3/2014 | Kwon | H04W 36/0055 |
| | | | 370/331 |
| 2014/0233528 A1* | 8/2014 | Webb | H04W 72/04 |
| | | | 370/330 |
| 2016/0227575 A1* | 8/2016 | Furuskog | H04W 72/1294 |

\* cited by examiner

RANDOM ACCESS PROCEDURE FOR MACHINE TYPE COMMUNICATION

FIELD

The subject matter disclosed herein relates generally to wireless communications and more particularly relates to alleviating congestion during random access of user equipments (UEs) using enhanced machine-type communications (eMTC).

BACKGROUND

The following abbreviations are herewith defined. At least some of which are referred to within the following description.

3GPP: Third Generation Partnership Project
BLER: Block Error Rate
CE: Coverage Enhancement
CRC: Cyclic Redundancy Check
C-RNTI: Cell Radio Network Temporary Identifier
DCI: Downlink Control Information
DL: Downlink
ECCE: Enhanced Control Channel Element
EREG: Enhanced Resource Element Group
eMTC: Enhanced Machine-Type Communications
eNB: Evolved Node B
EPDCCH: Enhanced Physical Downlink Control Channel
FDD: Frequency-Division Duplex
LTE: Long Term Evolution
M-PDCCH: Machine-Type Communications Physical Downlink Control Channel
MTC: Machine-Type Communications
OFDM: Orthogonal Frequency Division Multiplexing
PCFICH: Physical Control Format Indicator Channel
PCID: Physical Cell Identity
PDCCH: Physical Downlink Control Channel
PDSCH: Physical Downlink Shared Channel
PHICH: Physical Hybrid-ARQ Indicator Channel
PRACH: Physical Random Access Channel
PRB: Physical Resource Block
PUCCH: Physical Uplink Control Channel
PUSCH: Physical Uplink Shared Channel
RA-RNTI: Random Access Radio Network Temporary Identifier
RACH: Random Access Channel
RAR: Random Access Response
RNTI: Radio Network Temporary Identifier
RSRP: Reference Signal Received Power
RRC: Radio Resource Control
SC-FDMA: Single Carrier Frequency-Division Multiple Access
SIB: System Information Block
TB: Transport Block
TC-RNTI: Temporary Cell Radio Network Temporary Identifier
TDD: Time-Division Duplex
TMSI: Temporary Mobile Subscriber Identity
UE: User Entity/Equipment (Mobile Terminal)
UL: Uplink
WiMAX: Worldwide Interoperability for Microwave Access Machine-type communications (MTC) via wireless communication networks, such as LTE systems, enable data services for wearable electronic devices, smart appliances, smart meters, and so forth. Enhanced MTC (eMTC) allow for 15-20 dB more enhanced coverage compared to existing LTE networks and lower power consumption. To support the 15-20 dB more enhanced coverage, repetition of control channels and data channels are used along with soft combining in the receiver. The bandwidth of an eMTC user equipment (UE) is reduced to 1.4 MHz in both downlink and uplink. In certain configurations, a single eMTC UE can tune to different 1.4 MHz narrow bands across the whole system bandwidth over time. As may be appreciated, the eMTC UEs cannot receive PDCCH (because PDCCH spans across the whole system bandwidth as defined by 3GPP) in a system with a bandwidth larger than 1.4 MHz. Using M-PDCCH (which is based on EPDCCH as defined by 3GPP) instead may be a natural solution for transmitting a control message to an eMTC UE. M-PDCCH may only be transmitted on a subset of the PRBs within the system bandwidth.

As the number of eMTC UEs is expected to be high, access congestion may occur, particularly when the eMTC UEs perform random access around the same time. For example, with high numbers of eMTC UEs initiating random access around the same time, congestion of the contention resolution message, also referred to as Msg4, may become severe.

An eMTC UE initiates random-access by transmitting a preamble sequence to an eNB on the random access channel (RACH) (also referred to as Msg1) in a time-frequency resource. The PRACH time-frequency resource is configured by higher layers, e.g. broadcasted in a system information block (SIB). The eMTC UE selects one of sixty-four (64) RACH preambles to transmit in a PRACH time-frequency resource. Consequently, it is possible for two or more eMTC UEs to send the same preamble sequence in the same frame. In response to receiving a Msg1, the eNB sends a random access response (RAR) (also referred to as Msg2). The RAR includes a temporary cell radio network temporary identifier (TC-RNTI) assigned to the eMTC UE and an uplink (UL) grant. The Msg2 is transmitted on the physical downlink shared channel (PDSCH), and is scheduled by a DL grant transmitted on an MTC physical downlink control channel (M-PDCCH). The M-PDCCH used to carry the DL grant scheduling the RAR is transmitted in a time-frequency resource determined according to a pre-determined rule. The time-frequency resource used by the PDSCH carrying the RAR is indicated by the DL grant scheduling the RAR.

After receiving the RAR, the eMTC UE sends a radio resource control (RRC) connection request (also referred to as Msg3) using the UL grant. The frequency resource for transmission of Msg3 is indicated by the UL grant. In response to receiving the Msg3, the eNB sends a contention resolution message (also referred to as Msg4). The Msg4 is transmitted on the PDSCH, and is scheduled by a DL grant transmitted on the M-PDCCH. After sending the Msg3, the eMTC UE initiates the timer (mac-ContentionResolutionTimer) and continuously monitors the M-PDCCH for a DL grant scheduling the Msg4 until either the Msg4 is received or the timer expires. Conventionally, a UE monitors the same frequency resource for receiving the DL grant scheduling the Msg2 and the DL grant scheduling the Msg4. For an eMTC UE with coverage enhancement, the transmission of its M-PDCCH and PDSCH may be repeated over a number of subframes. In case multiple eMTC UEs with coverage enhancement initiate random access procedure, the M-PDCCH capacity may become limited for transmission of the DL grants scheduling Msg4 for multiple eMTC UEs. Consequently, an eMTC UE may need to monitor the M-PDCCH for DL grant scheduling Msg4 in much more subframes, which increases its power consumption.

BRIEF SUMMARY

Apparatuses for alleviating congestion during random access of eMTC UEs in a wireless communication system are disclosed. Methods and systems also perform the functions of the apparatus. In one embodiment, the apparatus includes a device having a radio transceiver that communicates over a mobile telecommunications network and a processor. The processor, in various embodiments, controls the radio transceiver to transmit a physical random access channel (PRACH) preamble on a first time-frequency resource. The processor also monitors a second time-frequency resource for a first downlink (DL) grant scheduling a random access response (RAR) corresponding to the transmitted PRACH preamble on the third time-frequency resource and controls the radio transceiver to receive the RAR on the third time-frequency resource. The processor further controls the radio transceiver to transmit a connection request message on a fourth time-frequency resource, wherein the fourth time-frequency resource is determined based on the RAR. Additionally, the processor determines a fifth time-frequency resource based on a time-frequency resource index, wherein the RAR includes the time-frequency resource index. Moreover, the processor monitors the fifth time-frequency resource for a second DL grant scheduling a contention resolution message.

In some embodiments, the time-frequency resource index comprises a time-delay index. In further embodiments, the processor initiates a contention resolution timer after an amount of delay based on the time-delay index. In certain embodiments, the time-delay index indicates a number of subframes, and wherein the fifth time-frequency resource starts at least the indicated number of subframes after a last subframe in the fourth time-frequency resource. In some embodiments, the second and fifth time-frequency resources have the same frequency resource.

In certain embodiments, the time-frequency resource index comprises a frequency index, and wherein the frequency resource of the fifth time-frequency resource is indicated by the frequency index. In further embodiments, the time-frequency resource index comprises a time-delay index, wherein the time-delay index indicates a number of subframes, and wherein the fifth time-frequency resource starts at least the indicated number of subframes after a last subframe in the fourth time-frequency resource. In some embodiments, the RAR includes a field containing the time-frequency index.

A method for a device includes transmitting a physical random access channel (PRACH) preamble on a first time-frequency resource. The method also includes monitoring the second time-frequency resource for first downlink (DL)'s grant scheduling a random access response (RAR) corresponding to the transmitted PRACH preamble on the third time-frequency resource and receiving the RAR on the third time-frequency resource. The method further includes transmitting a connection request message on a fourth time-frequency resource, wherein the fourth time-frequency resource is determined based on the RAR. Additionally, the method includes determining a fifth time-frequency resource based on a time-frequency resource index, wherein the RAR includes the time-frequency resource index. Moreover, the method includes monitoring the fifth time-frequency resource for a second DL grant scheduling a contention resolution message.

In some embodiments, the time-frequency resource index comprises a time-delay index. In further embodiments, the method includes initiating a contention resolution timer after an amount of delay based on the time-delay index. In certain embodiments, the time-delay index indicates a number of subframes, and wherein the fifth time-frequency resource starts at least the indicated number of subframes after a last subframe in the fourth time-frequency resource. In some embodiments, the second and fifth time-frequency resources have the same frequency resource.

In certain embodiments, the time-frequency resource index comprises a frequency index, and wherein the frequency resource of the fifth time-frequency resource is indicated by the frequency index. In further embodiments, the time-frequency resource index comprises a time-delay index, wherein the time-delay index indicates a number of subframes, and wherein the fifth time-frequency resource starts at least the indicated number of subframes after a last subframe in the fourth time-frequency resource. In some embodiments, the RAR includes a field containing the time-frequency index.

Also disclosed is an apparatus including a network equipment having a radio transceiver that communicates over a mobile telecommunication network and a processor. The processor, in various embodiments, controls the radio transceiver to receive at least one physical random access channel (PRACH) preamble on a first time-frequency resource. The processor also determines a time-frequency resource index. The processor further controls the radio transceiver to transmit a first downlink (DL) grant on a second time-frequency resource, the first DL grant scheduling a random access response (RAR) corresponding to the received PRACH preamble on a third time-frequency resource. The RAR includes the time-frequency resource index. Additionally, the processor controls the radio transceiver to receive a connection request message on a fourth time-frequency resource, wherein the fourth time-frequency resource is determined based on the RAR. Moreover, the processor controls the radio transceiver to transmit a second DL grant on a fifth time-frequency resource, the second DL grant scheduling a contention resolution message, wherein the fifth time-frequency resource is based on the time-frequency resource index.

In some embodiments, the time-frequency resource index comprises a time-delay index. In certain embodiments, the time-delay index indicates a number of subframes, and wherein the fifth time-frequency resource starts at least the indicated number of subframes after a last subframe in the fourth time-frequency resource. In some embodiments, the second and fifth time-frequency resources have the same frequency resource.

In certain embodiments, the time-frequency resource index comprises a frequency index, and wherein the frequency resource of the fifth time-frequency resource is indicated by the frequency index. In further embodiments, the time-frequency resource index comprises a time-delay index, wherein the time-delay index indicates a number of subframes, and wherein the fifth time-frequency resource starts at least the indicated number of subframes after a last subframe in the fourth time-frequency resource. In some embodiments, the RAR includes a field containing the time-frequency index.

A method for a network equipment includes receiving at least one physical random access channel (PRACH) preamble on a first time-frequency resource. The method also includes determining a time-frequency resource index. The method further includes transmitting a first downlink (DL) grant on a second time-frequency resource, the first DL grant scheduling a random access response (RAR) corresponding to the received PRACH preamble on a third time-frequency resource. The RAR includes the time-frequency resource index. Additionally, the method includes receiving a connection request message on a fourth time-frequency resource, wherein the fourth time-frequency resource is determined based on the RAR. Moreover, the method includes transmitting a second DL grant on a fifth time-frequency resource, the second DL grant scheduling a contention resolution message, wherein the fifth time-frequency resource is based on the time-frequency resource index.

In some embodiments, the time-frequency resource index comprises a time-delay index. In certain embodiments, the time-delay index indicates a number of subframes, and wherein the fifth time-frequency resource starts at least the indicated number of subframes after a last subframe in the fourth time-frequency resource. In some embodiments, the second and fifth time-frequency resources have the same frequency resource.

In certain embodiments, the time-frequency resource index comprises a frequency index, and wherein the frequency resource of the fifth time-frequency resource is indicated by the frequency index. In further embodiments, the time-frequency resource index comprises a time-delay index, wherein the time-delay index indicates a number of subframes, and wherein the fifth time-frequency resource starts at least the indicated number of subframes after a last subframe in the fourth time-frequency resource. In some embodiments, the RAR includes a field containing the time-frequency index.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
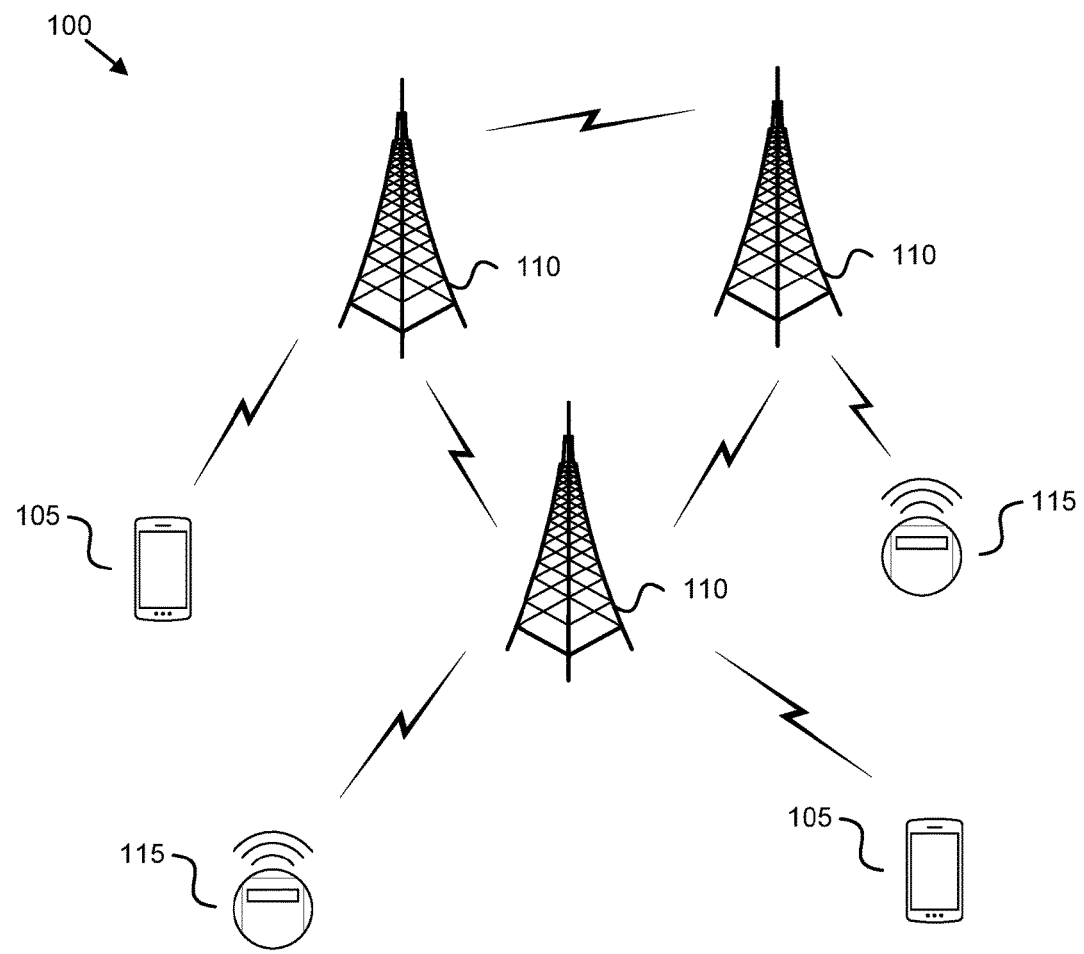
FIG. 1 is a schematic block diagram illustrating one embodiment of a wireless communication system for alleviating congestion during random access of eMTC UEs.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed embodiments describe alleviating congestion during random access of eMTC UEs in a system where a large number of eMTC UEs perform random access at the same time in a radio telecommunications network, such as an LTE system. Beneficially, the disclosed embodiments reduce power consumption of the eMTC UE, as compared to conventional methods. The disclosed embodiments are also beneficial for eMTC UEs in poor coverage, i.e. eMTC UEs which require repeated transmissions of the same information.

FIG. 1 depicts an embodiment of a wireless communication system 100 for alleviating congestion during random access of eMTC UEs. In one embodiment, the wireless communication system 100 includes one or more user equipment (UE) 105, one or more network equipment 110, and one or more eMTC UEs 115. Even though a specific number of UEs 105, network equipment 110, and eMTC UEs 115 are depicted in FIG. 1, one of skill in the art will recognize that any number of UEs 105, network equipment 110, and eMTC UEs 115 may be included in the wireless communication system 100.

In one embodiment, the UEs 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 105 include wearable devices, such as smart watches, fitness bands, optical head-mounted displays, or the like. Moreover, the UEs 105 may be referred to as subscriber units, mobiles, mobile stations, users, terminals, mobile terminals, fixed terminals, remote units, subscriber stations, user terminals, or by other terminology used in the art. The UEs 105 may communicate directly with one or more of the network equipment 110 via UL communication signals.

The network equipments 110 may be distributed over a geographic region. In certain embodiments, a network equipment 110 may also be referred to as an access point, an access terminal, a base, a base station, a base unit, a Node-B, an enhanced Node-B (eNB), a Home Node-B, a relay node, or by any other terminology used in the art. The network equipments 110 are generally part of a radio access network that includes one or more controllers communicably coupled to one or more corresponding network equipments 110. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one embodiment, the eMTC UEs 115 may include computing devices such as wearable electronic devices, smart meters, smart appliances, smart sensors, or the like. The eMTC UEs 115 are of lesser complexity than the UEs 105. In some embodiments, the eMTC UEs 115 support reduced bandwidth, reduced transmission power, and/or reduced support for downlink transmission modes, as compared to regular UEs 105. For example, the bandwidth of an eMTC UE may be reduced to 1.4 MHz in both the downlink and the uplink. In certain embodiments, the eMTC UEs 115 support ultra-long battery life via power consumption reduction techniques. In one embodiment, the eMTC UEs acquire data and transmit it to another node or machine. In some embodiments, the traffics to and from the eMTC UEs 115 are delay-tolerant.

In one implementation, the wireless communication system 100 is compliant with the 3GPP LTE protocol, wherein the network equipment 110 transmits using an OFDM modulation scheme on the DL and the UEs 105 and eMTC UEs 115 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

A network equipment 110 serves a number of UEs 105 and/or eMTC UEs 115 within a serving area, for example, a cell or a cell sector via a wireless communication link. For example, each network equipment 110 may support a plurality of serving cells, each serving cell including a component carrier upon which wireless signals containing network signaling and/or user data are communicated. The network equipment 110 transmits DL communication signals to serve the UEs 105 and/or eMTC UEs 115 in the time, frequency, and/or spatial domain. The network equipment 110 also receives UL communication signals from one or more UEs 105 and/or eMTC UEs 115 within the serving cells. For example, the network equipment 110 may receive a random access preamble sequence and/or connection request message from a plurality of eMTC UEs 115. As another example, the network equipment 110 may transmit a random-access response (RAR) and/or a contention resolution message to the plurality of eMTC UEs 115, in response to receiving the random access preamble sequence and/or connection request messages.

In an LTE system, the network equipment 110 indicates to a UE 105 that a PDSCH is scheduled using a DL grant transmitted on the Physical Downlink Control Channel (PDCCH). In some embodiments, the network equipment 110 indicates to an eMTC UE 115 that a PDSCH is scheduled using a DL grant transmitted on the MTC PDCCH (M-PDCCH). In certain embodiments, the DL grant corresponds to a Downlink Control Information (DCI) format. Different fields may be included in the DL grant to convey information related to a corresponding PDSCH. In some embodiments, the DCI may include other control information.

The M-PDCCH is reduced in bandwidth as compared to the regular PDCCH, in order to support the eMTC UEs 115 which are constrained to reduced bandwidth as compared to the regular UEs 105. In some embodiments, the M-PDCCH consists of one or two physical resource block (PRB) sets. The size of each M-PDCCH PRB set may be two, four, or six PRB pairs, with one PRB pair occupying two continuous timeslots of a subframe. The particular size and location of the M-PDCCH is application-specific, and thus may vary among the network equipments 110.

Figure 2:
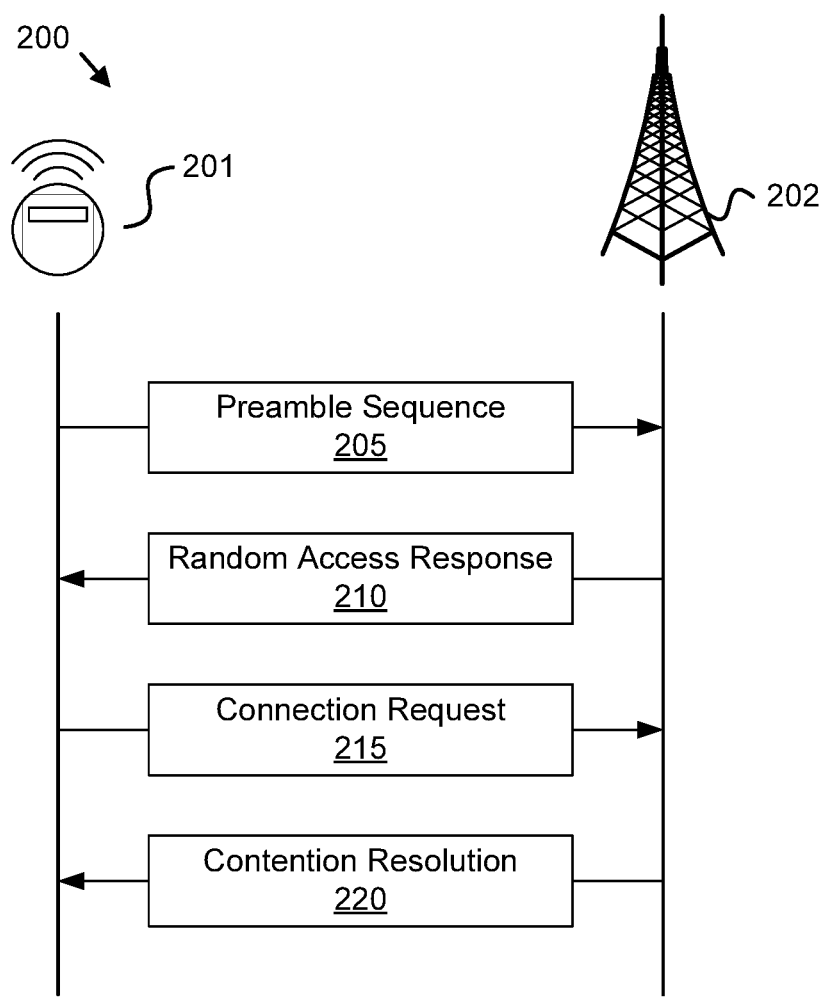
FIG. 2 is a block diagram illustrating one embodiment of random access procedure between an eMTC UE and network equipment useful for alleviating congestion during random access of eMTC UEs.

FIG. 2 is a block diagram illustrating one embodiment of random-access procedure 200 between an eMTC UE 201 and network equipment 202, according to embodiments of the disclosure. The eMTC UE 201 may be substantially similar to the eMTC UE 115 described above with reference to FIG. 1. The network equipment 202 may also be substantially similar to the network equipment 110 described above with reference to FIG. 1.

The eMTC UE 201 transmits a preamble sequence 205 to the network equipment 202 as a first message in a time-frequency resource. In some embodiments, the preamble sequence 205 may be one of sixty-four (64) available PRACH preambles. In a further embodiment, the eMTC UE 201 selects a PRACH preamble at random. In certain embodiments, the time-frequency resource used for the transmission of the first message determines a random-access radio network temporary identity (RA-RNTI) by which the eMTC UE 201 initially identifies itself to the network equipment 202. The eMTC UE 115 then awaits a response from the network equipment 202 (e.g., a random access response (RAR) 210). In certain embodiments, if the eMTC UE 201 does not receive any response from the network equipment 202, it then increases its power (in fixed steps) and transmits again a preamble sequence 205.

In response to receiving the preamble sequence 205, the network equipment 202 transmits a RAR 210 to the eMTC UE 201. In some embodiments, the network equipment 202 transmits an RAR 210 for each preamble sequence 205 it receives. Thus, if two or more eMTC UEs 201 transmit the same preamble sequence 205, the network equipment 202 may reply with a single RAR 210. The RAR 210 is sent in the PDSCH scheduled by an M-PDCCH with CRC scrambled by the RA-RNTI. Multiple RARs (corresponding to multiple received PRACH preambles) may be transmitted in the same PDSCH. The RAR 210 may include an uplink grant, a temporary cell-RNTI (TC-RNTI), and a timing advance value (to compensate for round-trip delay caused by distance between the eMTC UE 201 and the network equipment 202). The RAR 210, in one embodiment, also includes a time-frequency resource index used to alleviate congestion during random access of eMTC UEs 201. The time-frequency resource index is described in greater detail below, with reference to FIGS. 3A, 3B, 4A, and 4B.

In response to receiving the RAR 210, the eMTC UE 201 identifies an uplink resource and TC-RNTI assigned to it via the RAR 210. The eMTC UE 201 further identifies the time-frequency resource index. The eMTC UE 201 transmits an RRC connection request message 215 on the identified uplink resource. The RRC connection request message 215 may include the TC-RNTI, a UE identity (e.g., a temporary mobile subscriber identity (TMSI)), and the reason for connecting to the network equipment 202.

In one embodiment, the eMTC UE 201 initiates a timer (e.g., the mac-ContentionResolutionTimer) in response to transmitting the connection request message 215 and continuously monitors the M-PDCCH for a response (e.g., the contention resolution message 220). In another embodiment, the eMTC UE 201 defers both initiating the timer and monitoring the M-PDCCH for an amount of time indicated by the time-frequency resource index. For example, the time-frequency resource index may indicate that the eMTC UE 201 should wait for eight subframes (e.g., a duration of 8 ms) before initiating a timer and monitoring the M-PDCCH for a contention resolution message 220.

In response to receiving the RRC connection request message 215, the network equipment 202 transmits a contention resolution message 220 to the eMTC UE 201. The contention resolution message 220 includes contention resolution information as well as an RRC connection setup message. The network equipment 202 transmits the contention resolution message 220 via the PDSCH and schedules the contention resolution message 220 via M-PDCCH. For example, the M-PDCCH may include a DL grant pointing to the PDSCH. In some embodiments, the particular M-PDCCH with which the contention resolution message 220 is scheduled is based on the TC-RNTI. In other embodiments, the particular M-PDCCH with which the contention resolution message 220 is scheduled is based on a coverage enhancement level (CE level) of the eMTC UE 201. In yet other embodiments, the particular M-PDCCH with which the contention resolution message 220 is scheduled is based on the time-frequency resource index included in the RAR 210.

In some embodiments, the eMTC UE 201 may fail to receive the contention resolution message 220 before the timer (e.g., the (mac-ContentionResolutionTimer) expires. In such circumstances, the eMTC UE 201 regards the random access procedure 200 unsuccessful and begins anew by sending a preamble sequence 205.

Figure 3A:
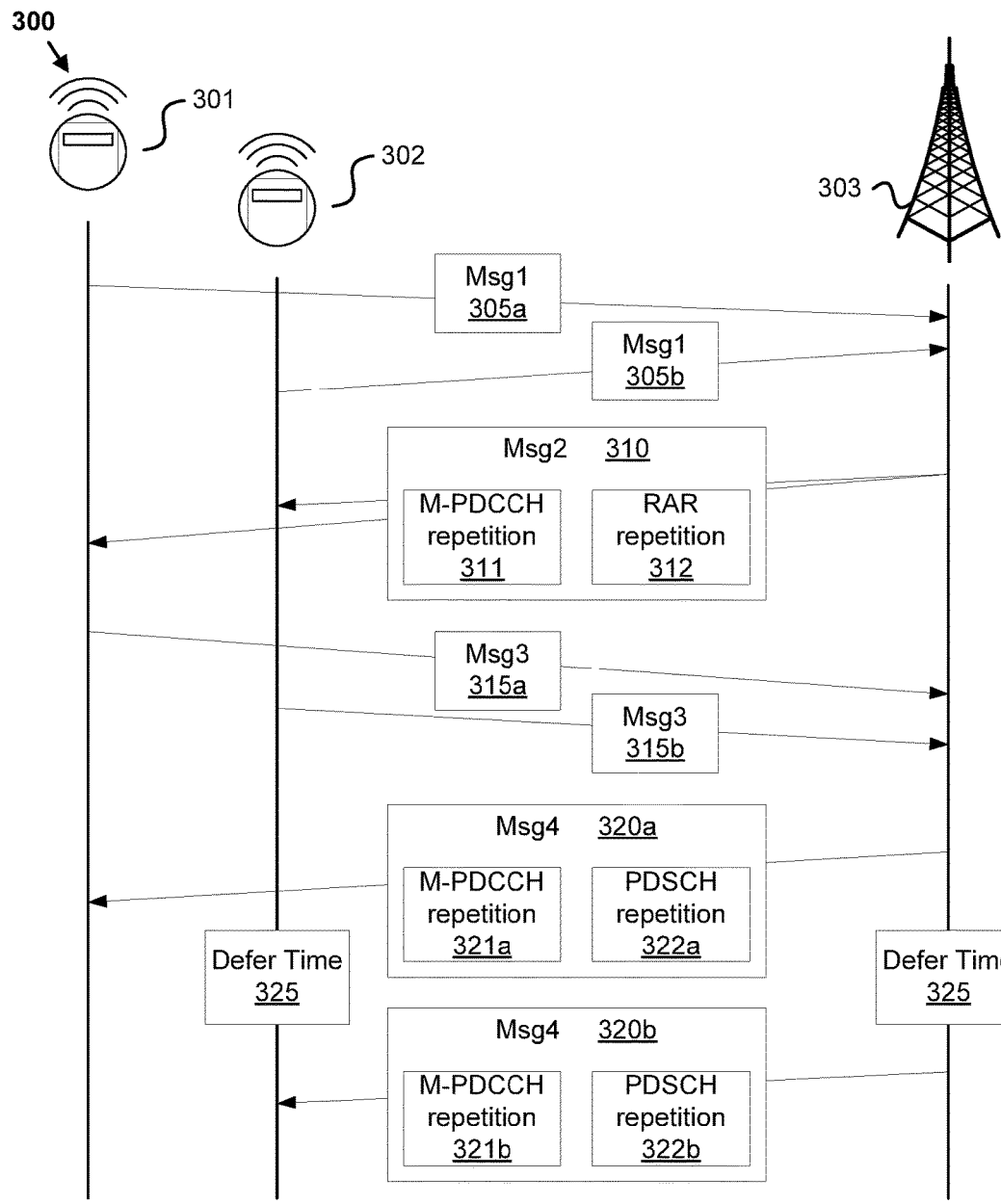
FIG. 3A is a diagram illustrating one embodiment of a random access procedure between a plurality of eMTC UEs and network equipment useful for alleviating congestion during random access of eMTC UEs.

FIG. 3A is a diagram illustrating a random access procedure 300 between a plurality of eMTC UEs 301-302 and a network equipment 303 useful for alleviating congestion during random access of eMTC UEs. The eMTC UEs 301-302 may be substantially similar to the eMTC UEs 115 described above with reference to FIG. 1. The network equipment 303 may be substantially similar to the network equipment 110 described above with reference to FIG. 1.

Here, the eMTC UE 301 transmits a first message (Msg1) 305a while the eMTC UE 302 also transmits a Msg1 305b roughly around the same time. For example, the eMTC UEs 301-302 may transmit the PRACH during the same subframe. Both eMTC UEs 301-302 transmit on the same frequency position. For example, both eMTC UEs 301-302 may have the same CE level, and thus send their Msg1 305a-b at the same frequency position.

Figure 3B:
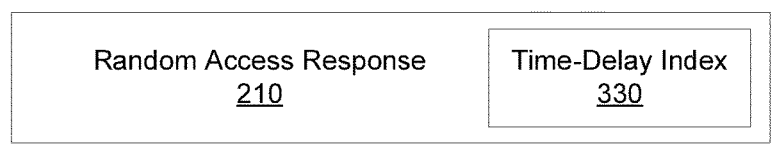
FIG. 3B is a block diagram illustrating one embodiment of a random access response message useful for alleviating congestion during random access of eMTC UEs.

In response to the Msg1 305a-b, the network equipment 303 sends a second message (Msg2) 310 to both the eMTC UE 301 and the eMTC UE 302. The network equipment 303 transmits the Msg2 310 on PDSCH and the corresponding DL grant on M-PDCCH. As the eMTC UEs 301-302 sent their Msg1 at the same time and frequency position, the Msg2 to eMTC UEs 301-302 may be transmitted in the same PDSCH. The network equipment 303 schedules one data unit that contains an RAR for each of eMTC UE 301 and eMTC UE 302. In one embodiment, the Msg2 310 includes an RAR 210 including a time-delay index 330, as depicted in FIG. 3B. Each RAR 210 includes resource allocation for the respective eMTC UE's Msg3 315 transmission. In some embodiments, the eMTC UEs 301-302 operate in enhanced coverage, thus requiring M-PDCCH repetition 311 and RAR repetition 312. In one embodiment, the number of repetitions is based on the coverage enhancement (CE) level of the eMTC UE 301-302, where a higher CE level may have more repetitions than a lower CE level.

In response to the Msg2 310, each of the eMTC UEs 301-302 identifies a resource allocation for the respective eMTC UE's Msg3 transmission, which may be in different narrow bands. Accordingly, the eMTC UE 301 transmits a Msg3 315a using a first UL resource allocation and the eMTC UE 302 transmits a Msg3 315b using a second UL resource allocation. After sending the Msg3 315a, the eMTC UE 301 initiates a timer (e.g., a mac-ContentionResolutionTimer) and begins monitoring for a Msg4 320a (e.g., monitoring the M-PDCCH for a DL grant scheduling the Msg4 320a).

However, the RAR 210 for the eMTC UE 302 includes a time-frequency resource index with a time-delay index 330 indicating a defer time 325 during which the eMTC UE 302 delays initiating a timer (mac-ContentionResolutionTimer) and also delays monitoring for a Msg4 320b (e.g., monitoring the M-PDCCH for a DL grant scheduling the Msg4 320b). The length of the defer time 325 may be indicated by the network equipment 303 by including new bit fields in the RAR 210, as described below with respect to FIG. 3B. The defer time 325 alleviates congestion in Msg4 reception in the time domain. By not monitoring the M-PDCCH during the defer time 325 the eMTC UE 302 conserves power as monitoring the M-PDCCH would be in vain. In some embodiments, the eMTC UEs 301-302 operate in enhanced coverage, thus requiring M-PDCCH repetition 321a and PDSCH repetition 322a associated with the Msg4 320a, and M-PDCCH repetition 321b and PDSCH repetition 322b associated with the Msg4 320b.

In some embodiments, the defer time 325 consists of the time period between the first subframe in which the UE starts monitoring the M-PDCCH for the DL grant scheduling the Msg4 320a (or 320b) and the last subframe in the time-frequency resource used to transmit the Msg3 315a (or 315b). This embodiment mirrors the current 3GPP specification in which a contention resolution timer is set after the UE transmits Msg3. In other embodiments, the defer time 325 consists of the time period between the first subframe in which the eMTC UE 115 starts monitoring the M-PDCCH for the DL grant scheduling the Msg4 320a (or 320b) and the last subframe in the time-frequency resource used to receive the RAR, the time-frequency resource used to receive the DL grant scheduling the RAR, or even the time-frequency resource used to transmit the PRACH preamble.

In one embodiment, the frequency resource used by the eMTC UE 302 to monitor the M-PDCCH 321b for DL grant scheduling the Msg4 320b is the same as the frequency resource used by the eMTC UE to transmit the Msg1 305b. In another embodiment, the frequency resource used by the eMTC UE 302 to monitor the M-PDCCH 321b for DL grant scheduling the Msg4 320b is the same as the frequency resource used by the eMTC UE to monitor the M-PDCCH 311 for DL grant scheduling the RAR 312. In yet another embodiment, the frequency resource used by the eMTC UE 302 to monitor the M-PDCCH 321b for DL grant scheduling the Msg4 320b is the same as frequency resource used by the eMTC UE to receive the RAR 312. In a further embodiment, the frequency resource used by the eMTC UE 302 to monitor the M-PDCCH 321b for DL grant scheduling the Msg4 320b is the same as the frequency resource used by the eMTC UE to transmit the Msg3 315b.

FIG. 3B is a block diagram illustrating one embodiment of a random access response message 210 useful for alleviating congestion during random access of eMTC UEs. As depicted, the RAR 210 may include a time-frequency resource index field such as the delay-time index 330 which specifies the defer time 325. The delay-time index 330 may include one or more bits. In a non-limiting example, the defer time 325 may be coded using a three bit value. In some embodiments, the delay-time index 330 may indicate a number of subframes during which the eMTC UE 302 should delay initiating a timer and monitoring the M-PDCCH. In one embodiment, the defer time 325 may be measured in units of subframes (e.g., 1 ms), however, other units of measurement may be used in other embodiments. After waiting for the specified defer time 325, the eMTC UE 302 initiates the timer and begins monitoring the M-PDCCH for a DL grant scheduling the Msg4 320b.

The network equipment 303 determines the time-delay index 330 for the eMTC UE 302. For example, because M-PDCCH resources are limited and because a large number of eMTC UEs 115 may be performing random access to the network equipment 303, the network equipment 303 may determine to send the Msg4 320b in a different frame (or subframe) than the Msg4 320a even though both eMTC UEs 301-302 initiated the random access procedure at about the same time. In one embodiment, a RAR 210 for the eMTC UE 301 includes a time-frequency resource index 330 with a time-delay index of zero (i.e., indicating no defer time for the eMTC UE 301).

Figure 4A:
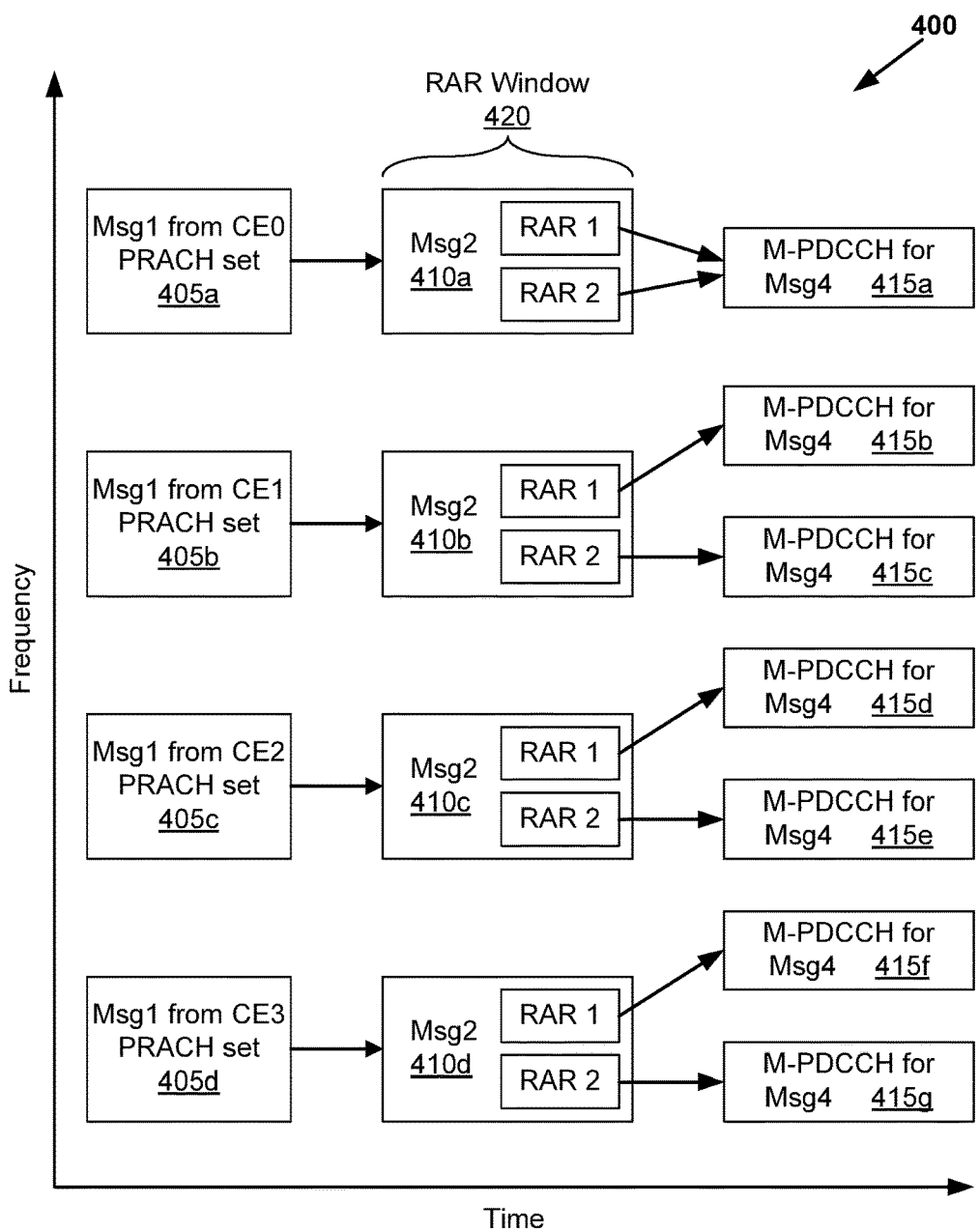
FIG. 4A is another diagram illustrating another embodiment of a random access procedure between a plurality of eMTC UEs and network equipment.

FIG. 4A is another diagram illustrating a random access procedure 400 between a plurality of eMTC UEs 115 (not shown) and network equipment 110 (not shown). FIG. 4A depicts the random access procedure 400 on a time-frequency plot. Assume there is one M-PDCCH for RAR corresponding to each PRACH resource set. An eMTC UE 115 can determine the M-PDCCH for RAR based on the PRACH resource used for Msg1 transmission. Here four PRACH resource sets are defined, each PRACH resource set associated with a coverage enhancement (CE level). The depicted embodiment shows four CE levels (e.g., CE0, CE1, CE2, and CE3) where CE0 is the lowest CE level and CE3 is the highest CE level. The PRACH resource set defines the narrowband in which an eMTC UE 115 transmits its Msg1. In certain embodiments, the PRACH resource sets are indicated in a system information block (SIB) broadcasted by the network equipment 110. The different configurations for M-PDCCH that may be used to transmit DL grant scheduling RAR corresponding to the four different PRACH resource sets may also be broadcasted in the SIB. Based on the narrowband in the subframe in which the Msg1 is sent, the eMTC UE 115 derives a RA-RNTI.

Based on its RSRP measurement, each eMTC UE 115 determines its CE level and, consequently, selects one of the four PRACH resource sets to use corresponding to its CE level. Within this PRACH resource set, the eMTC UE 115 selects one preamble. As depicted, at least two eMTC UEs 115 transmit a Msg1 405a on the CE0 PRACH resource set, at least two eMTC UEs 115 transmit a Msg1 405b on the CE1 PRACH resource set, at least two eMTC UEs 115 transmit a Msg1 405c on the CE2 PRACH resource set, and at least two eMTC UEs 115 transmit a Msg1 405d on the CE3 PRACH resource set. The eMTC UEs 115 monitor the M-PDCCH corresponding to their respective PRACH resources for DL grant scheduling RAR during an RAR monitoring time window 420. Each eMTC UE 115 decodes the corresponding M-PDCCH for RAR using the RA-RNTI based on its CE level, and then receives its RAR according to a DL grant transmitted on the M-PDCCH.

Figure 4B:
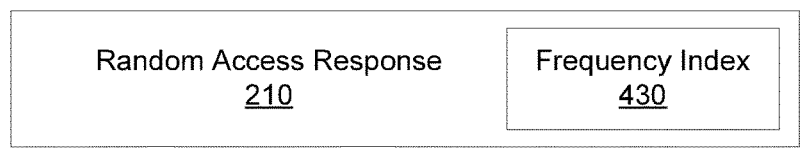
FIG. 4B is a block diagram illustrating another embodiment of a random access response message useful for alleviating congestion during random access of eMTC UEs.

After the network equipment 110 receives a Msg1 405a-d from each eMTC UE 115, the network equipment 110 knows the CE level corresponding to each eMTC UE 115 and will send Msg2 410a-d to the eMTC UEs 115 according to the same CE level. As depicted, each Msg2 410a-d includes at least a first RAR and a second RAR for the at least two eMTC UEs 115 transmitting on each PRACH resource set. In some embodiments, each RAR includes an RAR 210 including a frequency index 430, as depicted in FIG. 4B. The frequency index 430 indicates a frequency resource (e.g., narrowband) on which the eMTC UE 115 is to monitor M-PDCCH for DL grant scheduling a Msg4.

As depicted, the network equipment 110 may direct the eMTC UEs 115 associated with the CE0 PRACH set (also referred to as the "CE0 eMTC UEs") to monitor a first M-PDCCH 415a for a Msg4 specific to the CE0 eMTC UEs. In some embodiments, the network equipment 110 may transmit a RAR 210 having a frequency index 430 to the CE0 eMTC UEs, wherein the frequency index 430 indicates the specific a frequency resource (e.g., narrowband) of the first M-PDCCH 415a, as discussed below with reference to FIG. 4B.

The network equipment 110 may direct at least a first eMTC UE 115 associated with the CE1 PRACH set (also referred to as a "CE1 eMTC UE") to monitor a second M-PDCCH 415b for Msg4 specific to that eMTC UE 115 and direct at least a second CE1 eMTC UE 115 to monitor a third M-PDCCH 415c for Msg4 specific to that eMTC UE 115. For example, the frequency index 430 included in the RAR 210 directed to the first CE1 eMTC UE 115 may indicate the frequency resource of the second M-PDCCH 415b. As another example, the frequency index 430 included in the RAR 210 directed to the second CE1 eMTC UE 115 may indicate the frequency resource of the third M-PDCCH 415c.

The network equipment 110 may direct at least a first eMTC UE 115 associated with the CE2 PRACH set (also referred to as a "CE2 eMTC UE") to monitor a fourth M-PDCCH 415d for Msg4 specific to that eMTC UE 115 and direct at least a second CE2 eMTC UE 115 to monitor a fifth M-PDCCH 415e for Msg4 specific to that eMTC UE 115. For example, the frequency index 430 included in the RAR 210 directed to the first CE2 eMTC UE 115 may indicate the frequency resource of the fourth M-PDCCH 415d. As another example, the frequency index 430 included in the RAR 210 directed to the second CE2 eMTC UE 115 may indicate the frequency resource of the fifth M-PDCCH 415e.

The network equipment 110 may direct at least a first eMTC UE 115 associated with the CE3 PRACH set (also referred to as a "CE3 eMTC UE") to monitor a sixth M-PDCCH 415f for Msg4 specific to that eMTC UE 115 and direct at least a second CE3 eMTC UE 115 to monitor a seventh M-PDCCH 415g for Msg4 specific to that eMTC UE 115. For example, the frequency index 430 included in the RAR 210 directed to the first CE3 eMTC UE 115 may indicate the frequency resource of the sixth M-PDCCH 415f. As another example, the frequency index 430 included in the RAR 210 directed to the second CE3 eMTC UE 115 may indicate the frequency resource of the seventh M-PDCCH 415g.

The defer time 325 depicted FIG. 3A may lead to a large latency for some eMTC UEs 115 to complete the random access procedure where a large number of eMTC UEs 115 are attempting to access the network equipment 110 during the same time period. Accordingly, to reduce latency of the random access procedure, the network equipment 110 may transmit the Msg4 for the large number of eMTC UEs 115 in parallel (e.g., in the same time) on several narrow bands. Thus all the eMTC UEs 115 may receive their respective Msg4 within a shorter amount of time. Therefore, the random access procedure 400 is completed faster than conventional random access procedures for the same large number of eMTC UEs 115. Additionally, the random access procedure 400 conserves power at the eMTC UEs 115 as compared to the conventional random access procedure for the same large number of eMTC UEs 115

FIG. 4B is a block diagram illustrating another embodiment of a random access response message 210 useful for alleviating congestion during random access of eMTC UEs 115. As depicted, the RAR 210 may include a time-frequency resource index field such as the frequency index 430 which specifies the frequency resource on which the eMTC UE 115 is to monitor M-PDCCH for a DL grant scheduling a contention resolution message (Msg4). The frequency index 430 may include one or more bits. In a non-limiting example, the frequency resource may be coded using a four bit value. In some embodiments, the frequency index 430 may indicate a narrowband on which the eMTC UE 505 should monitor M-PDCCH for a DL grant scheduling the Msg4.

In some embodiments, the RAR 210 may not include a frequency index 430. In one embodiment, the eMTC UE 115 receiving the RAR 210 without a frequency index 430 may monitor the M-PDCCH (for scheduling Msg4) on the same narrowband used by the eMTC UE to transmit the Msg1. In another example, the eMTC UE 115 receiving the RAR 210 without a frequency index 430 may monitor the M-PDCCH (for scheduling Msg4) on the same narrowband used by the eMTC UE to monitor the M-PDCCH for a DL grant scheduling the RAR. In yet another embodiment, the eMTC UE 115 receiving the RAR 210 without a frequency index 430 may monitor the M-PDCCH (for scheduling Msg4) on the same narrowband used by the eMTC UE to receive the RAR 312. In a further embodiment, the eMTC UE 115 receiving the RAR 210 without a frequency index 430 may monitor the M-PDCCH (for scheduling Msg4) on the same narrowband used by the eMTC UE 115 for Msg3 transmission.

In certain embodiments, the RAR 210 may include both a time-delay index 330 and a frequency index 430. Thus, an eMTC UE 115 may delay initiating the mac-ContentionResolutionTimer for a defer time specified in the time-delay index 330 and, at the end of the defer time, may monitor a frequency resource specified in the frequency index 430 a DL grant scheduling contention resolution message (Msg4). In other embodiments, the RAR 210 may include a frequency index 430, but not a time-delay index 330. Thus, an eMTC UR 115 may initiate the mac-ContentionResolutionTimer after sending a RRC connection request (Msg3) and immediately monitor a frequency resource specified in the frequency index 430 a DL grant scheduling contention resolution message (Msg4).

Figure 5:
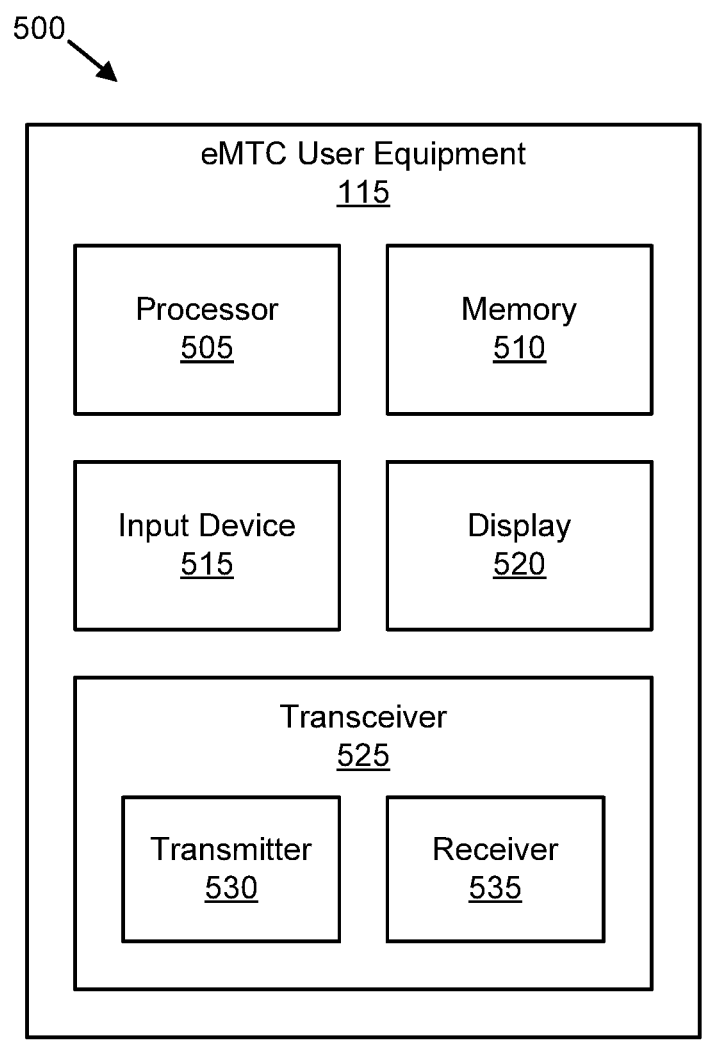
FIG. 5 is a schematic block diagram illustrating one embodiment of an apparatus that may be used for alleviating congestion during random access of eMTC UEs.

FIG. 5 depicts one embodiment of an apparatus 500 that may be used for alleviating congestion during random access of eMTC UEs. The apparatus 500 includes one embodiment of an eMTC UE 115. Furthermore, the eMTC UE 115 may include a processor 505, a memory 510, and a transceiver 525. In some embodiments, the eMTC UE 115 may include an input device 515 and/or a display 520. In certain embodiments, the input device 515 and the display 520 may be combined into a single device, such as a touchscreen.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the processor 505 controls the transceiver 525 to transmit UL signals to the network equipment 110 and/or receive DL signals from the network equipment 110. For example, the processor 505 may control the transceiver 525 to transmit a PRACH preamble of a RACH time-frequency resource. In another example, the processor 505 may control the transceiver 525 to receive a RAR. In a further example, the processor 505 may control the transceiver 525 to transmit a message on a time-frequency resource indicated in the RAR, as described above. In certain embodiments, the processor 505 may monitor DL signals received via the transceiver 525 for specific messages. For example, the processor 505 may monitor a time-frequency resource for a first downlink (DL) grant scheduling a random access response (RAR) corresponding to the transmitted PRACH preamble. As another example, the processor 525 may monitor a time-frequency resource based on a time-frequency resource index for a second downlink (DL) grant scheduling a contention resolution message.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to alleviating congestion during random access of eMTC UEs. In some embodiments, the memory 510 also stores program code and related data, such as an operating system or other controller algorithms operating on the eMTC UE 115.

The eMTC UE 115 may optionally include an input device 515. The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel. In certain embodiments, the input device 515 may include one or more sensors for monitoring an environment of the eMTC UE 115.

The eMTC UE 115 may optionally include a display 520. The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 may include one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The transceiver 525, in one embodiment, is configured to communicate wirelessly with the network equipment 110. In certain embodiments, the transceiver 525 comprises a transmitter 530 and a receiver 535. The transmitter 530 is used to transmit UL communication signals to the network equipment 110 and the receiver 535 is used to receive DL communication signals from the network equipment 110. For example, the transmitter 530 may transmit a preamble sequence on the PRACH and later transmit a connection request message. As another example, the receiver 535 may receive a RAR from a network equipment 110. The RAR may include a time-frequency resource index for example a time-delay index 330 and/or a frequency index 430, described above with reference to FIGS. 3A, 3B, 4A, and 4B. Based on the time-frequency resource index, the receiver 535 may receive a M-PDCCH at a time and/or on a frequency resource specified by the time-frequency resource index.

The transmitter 530 and the receiver 535 may be any suitable types of transmitters and receivers. Although only one transmitter 530 and one receiver 535 are illustrated, the transceiver 525 may have any suitable number of transmitters 525 and receivers 530. For example, in some embodiments, the eMTC UE 115 includes a plurality of transmitter 530 and receiver 535 pairs for communicating on a plurality of wireless networks and/or radio frequency bands, each transmitter 530 and receiver 535 pair configured to communicate on a different wireless network and/or radio frequency band than the other transmitter 530 and receiver 535 pairs.

Figure 6:
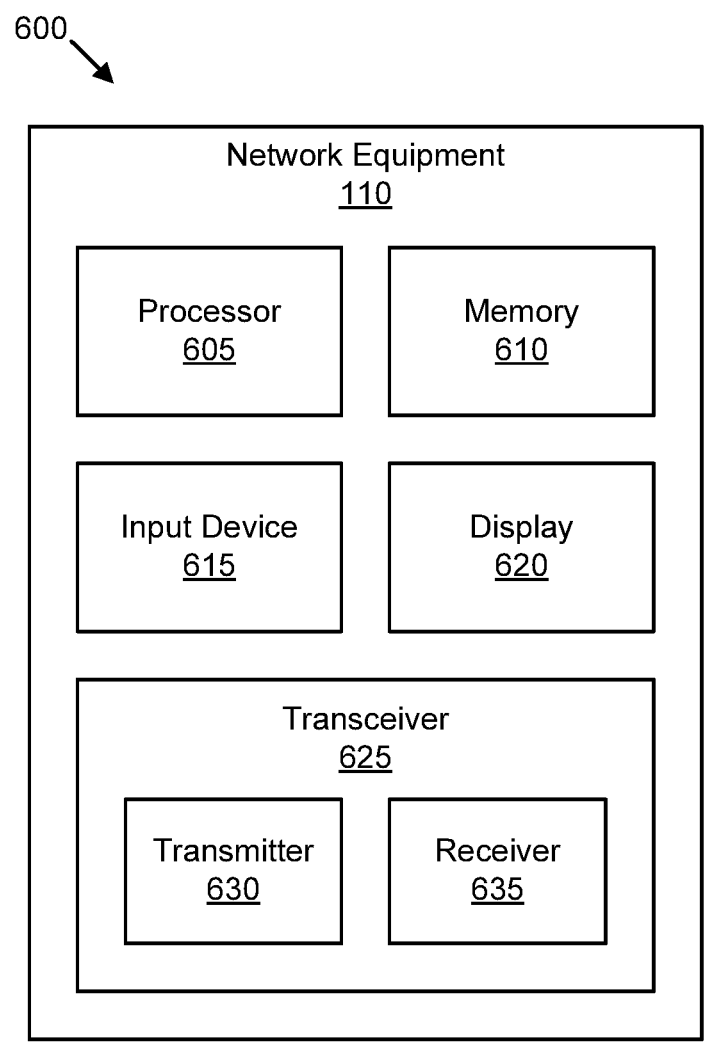
FIG. 6 is a schematic block diagram illustrating another embodiment of an apparatus that may be used for alleviating congestion during random access of eMTC UEs.

FIG. 6 depicts another embodiment of an apparatus 600 that may be used for alleviating congestion during random access of eMTC UEs. The apparatus 600 includes one embodiment of the network equipment 110. Furthermore, the network equipment 110 may include a processor 605, a memory 610, an input device 615, a display 620, and a transceiver 625. As may be appreciated, the processor 605, the memory 610, the input device 615, and the display 620 may be substantially similar to the processor 505, the memory 510, the input device 515, and the display 520 of the eMTC UE 115, respectively.

In some embodiments, the processor 605 controls the transceiver 625 to transmit DL signals to a UE 105 and/or eMTC UE 115. The processor 605 may also control the transceiver 625 to receive UL signals from the UE 105 and/or eMTC UE 115. For example, the processor 605 may control the transceiver 625 to receive a PRACH preamble on a RACH time-frequency resource. In another example, the processor 605 may control the transceiver 625 to transmit a RAR containing a time-frequency resource index. In a further example, the processor 605 may control the transceiver 625 to receive a connection request message on a time-frequency resource indicated in the RAR. In yet another example, the processor 625 may control the transceiver 625 to transmit a second DL grant on a time-frequency resource based on a time-frequency resource index, the second DL grant scheduling a contention resolution message.

The transceiver 625, in one embodiment, is configured to communicate wirelessly with the network equipment 110. In certain embodiments, the transceiver 625 comprises a transmitter 630 and a receiver 635. The transmitter 630 is used to transmit DL communication signals to the eMTC UE 115 and the receiver 635 is used to receive UL communication signals from the eMTC UE 115. For example, the receivers 635 may receive a preamble sequence on the PRACH. As another example, the transmitter 630 may transmit a RAR from an eMTC UE 115. The RAR may include a time-frequency resource index for example a time-delay index 330 and/or a frequency index 430, described above with reference to FIGS. 3A, 3B, 4A, and 4B.

The transceiver 625 may communicate simultaneously with a plurality of UEs 105 and/or eMTC UEs 115. For example, the transmitter 630 may transmit DL communication signals received by multiple eMTC UEs 115. As another example, the receiver 635 may simultaneously receive UL communication signals from multiple eMTC UEs 115. The transmitter 630 and the receiver 635 may be any suitable types of transmitters and receivers. Although only one transmitter 630 and one receiver 635 are illustrated, the transceiver 625 may have any suitable number of transmitters 625 and receivers 630. For example, the network equipment 110 may serve multiple cells and/or cell sectors, wherein the transceiver 625 includes a transmitter 630 and receiver 635 for each cell or cell sector.

Figure 7A:
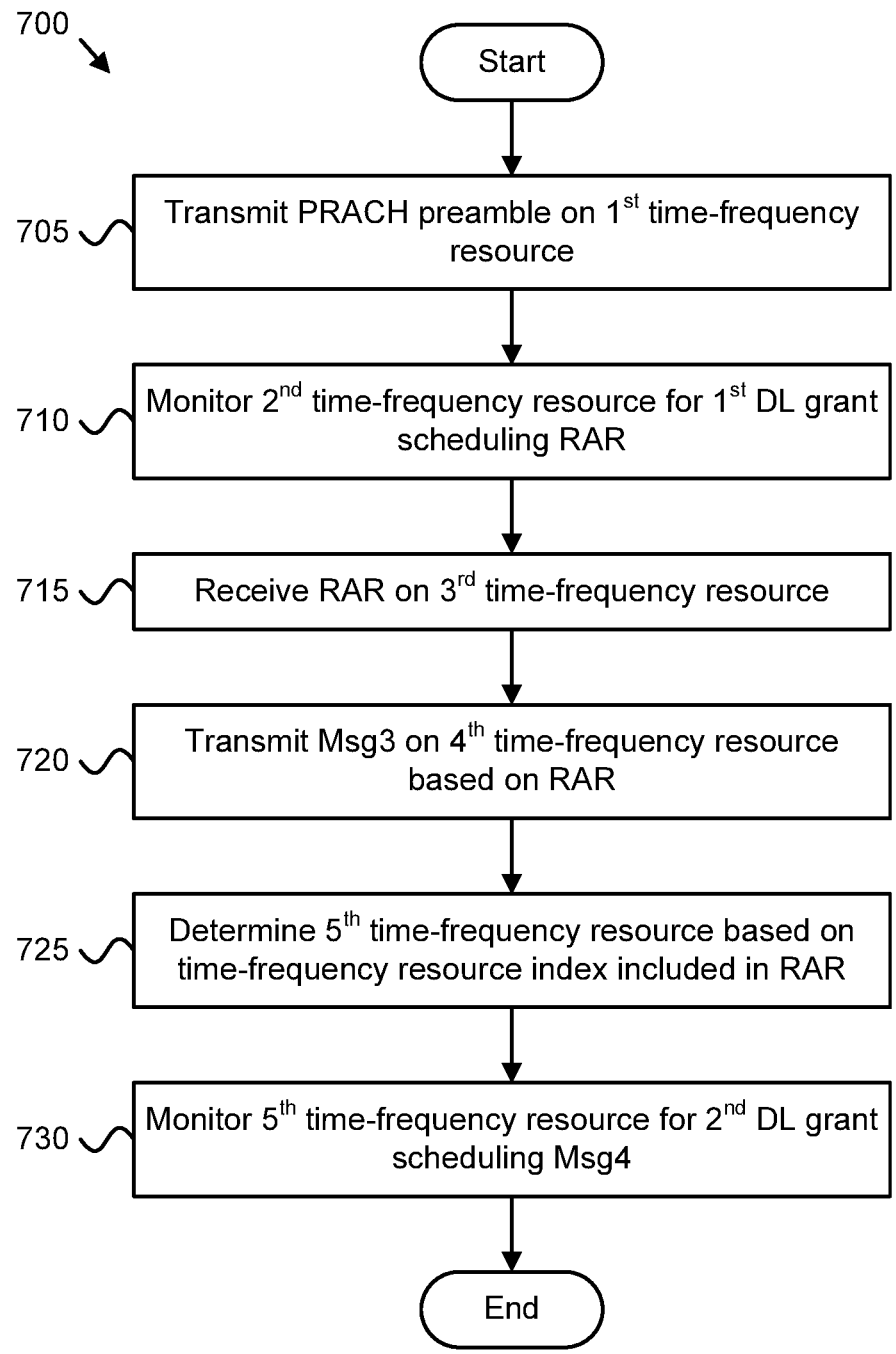
FIG. 7A is a schematic flow chart diagram illustrating one embodiment of a method for alleviating congestion during random access of eMTC UEs from a user equipment.

FIG. 7A is a schematic flow chart diagram illustrating one embodiment of a method 700 for alleviating congestion during random access of eMTC UEs 115. In some embodiments, the method 700 is performed by an apparatus, such as the eMTC UE 115. In certain embodiments, the method 700 may be performed by a processor executing program code, for example, a microcontroller, a microprocessor, a CPU, a GPU, an auxiliary processing unit, a FPGA, or the like.

The method 700 may include transmitting 705 a PRACH preamble on a first time-frequency resource. For example, an eMTC UE 115 may transmit 705 a PRACH preamble on a first time-frequency resource using a transmitter 530. In some embodiments, the first time-frequency resource is based on a CE level of the eMTC UE 115. The PRACH preamble may be selected from a plurality of available PRACH preamble sequences.

The method 700 may include monitoring 710 a second time-frequency resource for a first DL grant scheduling a RAR (corresponding to the transmitted PRACH preamble)

on a third time-frequency resource. For example, an eMTC UE 115 may monitor 710 a second time-frequency resource using a receiver 535. The method 700 may further include receiving 715 the RAR on the third time-frequency resource. For example, an eMTC UE 115 may receive 715 the RAR on the third time-frequency resource using the receiver 535.

The method 700 may include transmitting 720 a connection request message on a fourth time-frequency resource. For example, an eMTC UE 115 may transmit 720 the connection request message on the fourth time-frequency resource using the transmitter 530. In one embodiment, the fourth time-frequency resource is determined based on the RAR. For example, the RAR may include a UL grant indicating the fourth time-frequency resource.

The method 700 may include determining 725 a fifth time-frequency resource based on a time-frequency resource index. For example, an eMTC UE 115 may determine 725 the fifth time-frequency resource using a processor 505 and memory 510. The time-frequency resource index may be included in the RAR. In one embodiment, the time-frequency resource index comprises a time-delay index. For example, the time-delay index may be a field in the RAR indicating a number of subframes, wherein the fifth time-frequency resource starts at least the indicated number of subframes after a last subframe of the fourth time-frequency resource. In another embodiment, the time-frequency resource index comprises a frequency index. For example, the frequency index may be a field in the RAR indicating a specific narrowband. In some embodiments, the time-frequency resource index may include both a time-delay index and a frequency index.

The method 700 may include monitoring 730 the fifth time-frequency resource for a second DL grant scheduling a contention resolution message. The method 700 ends. As an example, an eMTC UE 115 may monitor 730 the fifth time-frequency resource using a receiver 535. In one embodiment, monitoring 730 the fifth time-frequency resource includes initiating a contention resolution timer after an amount of delay based on the time-delay index. In some embodiments, the second and fifth time-frequency resources have the same frequency resource.

Figure 7B:
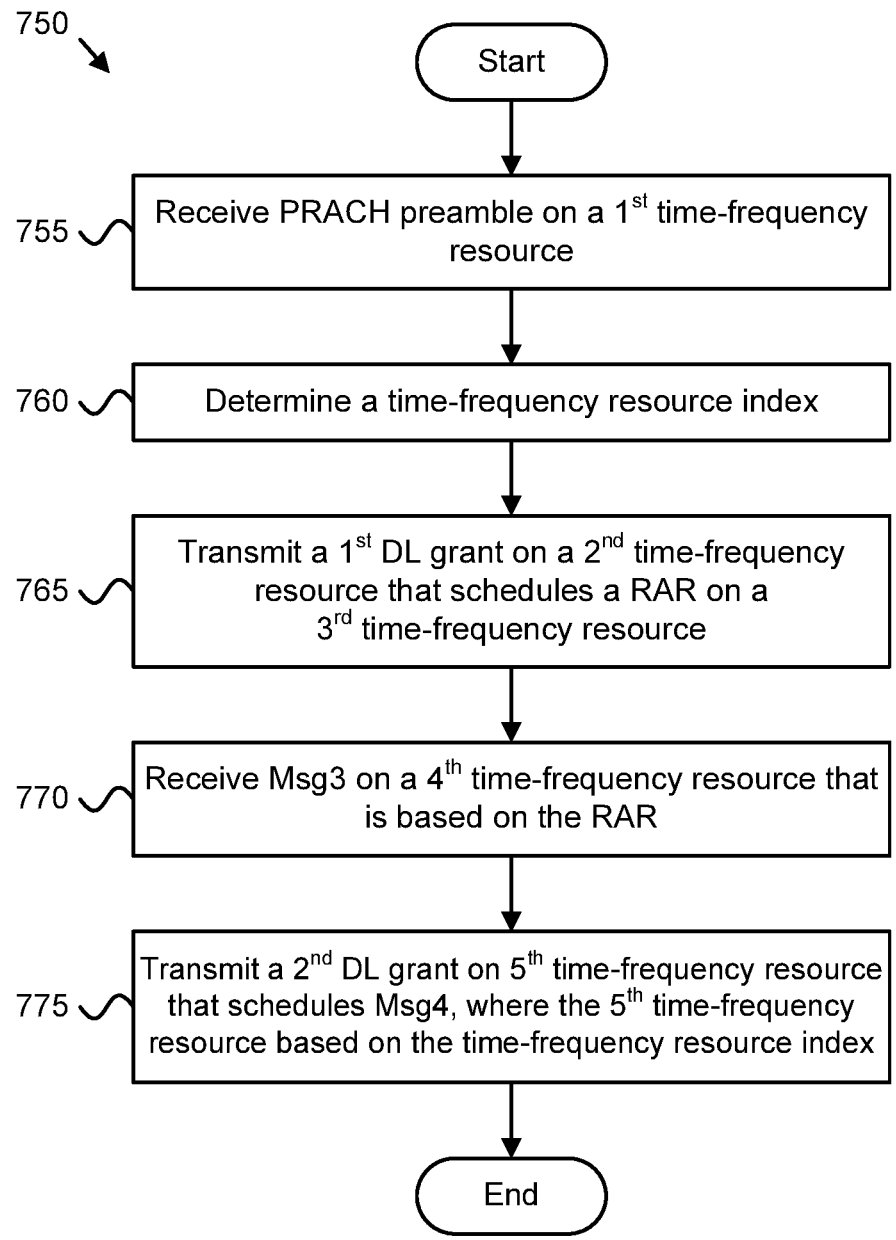
FIG. 7B is a schematic flow chart diagram illustrating one embodiment of a method for alleviating congestion during random access of eMTC UEs from a network equipment.

FIG. 7B is a schematic flow chart diagram illustrating one embodiment of a method 750 for alleviating congestion during random access of eMTC UEs 115. In some embodiments, the method 750 is performed by an apparatus, such as the network equipment 110. In certain embodiments, the method 750 may be performed by a processor executing program code, for example, a microcontroller, a microprocessor, a CPU, a GPU, an auxiliary processing unit, a FPGA, or the like.

The method 750 may include receiving 755 at least one PRACH preamble on a first time-frequency resource. For example, the network equipment 110 may receive 755 at least one PRACH preamble using the receiver 635. In some embodiments, the first time-frequency resource is based on a CE level of an eMTC UE 115, wherein receiving 755 a PRACH preamble on the first time-frequency resource includes identifying a CE level of an eMTC UE 115 which sent the PRACH preamble.

The method 750 may include determining 760 time-frequency resource index. For example, the network equipment 110 may determine 760 the time-frequency resource index using a processor 605 and memory 610. In some embodiments, the time-frequency resource index may be based on a number of eMTC UEs 115 transmitting a PRACH preamble within the same time period. In certain embodiments, the time-frequency resource index may be based on an amount of DL time-frequency resources available.

In one embodiment, the time-frequency resource index comprises a time-delay index. For example, the time-delay index may be a field in the RAR indicating a number of subframes, wherein the fifth time-frequency resource starts at least the indicated number of subframes after a last subframe of the fourth time-frequency resource. In another embodiment, the time-frequency resource index comprises a frequency index. For example, the frequency index may be a field in the RAR indicating a specific narrowband.

The method 750 may include transmitting 765 a first DL grant on a second time-frequency resource. For example, the network equipment 110 may transmit 765 a first DL grant using a transmitter 630. In some embodiments, the first DL grant schedules a RAR corresponding to a received PRACH preamble. In certain embodiments, the RAR may be scheduled on a third time-frequency resource. The RAR may include the time-frequency resource index. In some embodiments, the time-frequency resource index may include both a time-delay index and a frequency index.

The method 750 may include receiving 770 a connection request message on a fourth time-frequency resource. For example, the network equipment 110 may receive 770 the connection request message using a receiver 635. In some embodiments, the fourth time-frequency resource is determined based on the RAR.

The method 750 may include transmitting 775 a second DL grant on a fifth time-frequency resource. The method 750 ends. As an example, a network equipment 110 may transmit 775 a second DL grant on a fifth time-frequency resource using a transmitter 630. In some embodiments, the second DL grant schedules a contention resolution message. In certain embodiments, the fifth time-frequency resource is based on the time-frequency resource index. In another embodiment, the fifth time-frequency resource and the second time-frequency resource have the same frequency resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method, comprising:
  transmitting a physical random access channel (PRACH) preamble on a first time-frequency resource;
  monitoring a second time-frequency resource for a first downlink (DL) grant scheduling a random access response (RAR) corresponding to the transmitted PRACH preamble on a third time-frequency resource;
  receiving the RAR on the third time-frequency resource;
  transmitting a connection request message on a fourth time-frequency resource, wherein the fourth time-frequency resource is determined based on the RAR;
  determining a fifth time-frequency resource based on a time-frequency resource index, wherein the RAR includes the time-frequency resource index; and
  monitoring the fifth time-frequency resource for a second DL grant scheduling a contention resolution message.

2. The method of claim 1, wherein the time-frequency resource index comprises a time-delay index.

3. The method of claim 2, further comprising:
  initiating a contention resolution timer after an amount of delay based on the time-delay index.

4. The method of claim 2, wherein the time-delay index indicates a number of subframes, and wherein the fifth time-frequency resource starts at least the indicated number of subframes after a last subframe in the fourth time-frequency resource.

5. The method of claim 4, wherein the second and fifth time-frequency resources have the same frequency resource.

6. The method of claim 1, wherein the time-frequency resource index comprises a frequency index, and wherein the frequency resource of the fifth time-frequency resource is indicated by the frequency index.

7. The method of claim 6, wherein the time-frequency resource index comprises a time-delay index, wherein the time-delay index indicates a number of subframes, and wherein the fifth time-frequency resource starts at least the indicated number of subframes after a last subframe in the fourth time-frequency resource.

8. The method of claim 1, wherein the RAR includes a field containing the time-frequency index.

9. A device comprising:
   a radio transceiver that communicates over a mobile telecommunications network; and
   a processor configured to:
   control the radio transceiver to transmit a physical random access channel (PRACH) preamble on a first time-frequency resource;
   monitor a second time-frequency resource for a first downlink (DL) grant scheduling a random access response (RAR) corresponding to the transmitted PRACH preamble on a third time-frequency resource;
   control the radio transceiver to receive the RAR on the third time-frequency resource;
   control the radio transceiver to transmit a connection request message on a fourth time-frequency resource, wherein the fourth time-frequency resource is determined based on the RAR;
   determine a fifth time-frequency resource based on a time-frequency resource index, wherein the RAR includes the time-frequency resource index; and
   monitor the fifth time-frequency resource for a second DL grant scheduling a contention resolution message.

10. The device of claim 9, wherein the time-frequency resource index comprises a time-delay index.

11. The device of claim 10, wherein the processor is further configured to:
    initiate a contention resolution timer after an amount of delay based on the time-delay index.

12. The device of claim 10, wherein the time-delay index indicates a number of subframes, and wherein the fifth time-frequency resource starts at least the indicated number of subframes after a last subframe in the fourth time-frequency resource.

13. The device of claim 12, wherein the second and fifth time-frequency resources have the same frequency resource.

14. The device of claim 9, wherein the time-frequency resource index comprises a frequency index, and wherein the frequency resource of the fifth time-frequency resource is indicated by the frequency index.

15. The device of claim 14, wherein the time-frequency resource index comprises a time-delay index, wherein the time-delay index indicates a number of subframes, and wherein the fifth time-frequency resource starts at least the indicated number of subframes after a last subframe in the fourth time-frequency resource.

16. The device of claim 9, wherein the RAR includes a field containing the time-frequency index.

17. A method, comprising:
    receiving at least one physical random access channel (PRACH) preamble on a first time-frequency resource;
    determining a time-frequency resource index;
    transmitting a first downlink (DL) grant on a second time-frequency resource, the first DL grant scheduling a random access response (RAR) corresponding to the received PRACH preamble on a third time-frequency resource, wherein the RAR comprises the time-frequency resource index;
    receiving a connection request message on a fourth time-frequency resource, wherein the fourth time-frequency resource is determined based on the RAR; and
    transmitting a second DL grant on a fifth time-frequency resource, the second DL grant scheduling a contention resolution message, wherein the fifth time-frequency resource is based on the time-frequency resource index.

18. The method of claim 17, wherein the time-frequency resource index comprises a frequency index, and wherein the frequency resource of the fifth time-frequency resource is indicated by the frequency index.

19. The method of claim 17, wherein the time-frequency resource index comprises a time-delay index, wherein the time-delay index indicates a number of subframes, and wherein the fifth time-frequency resource starts at least the indicated number of subframes after a last subframe in the fourth time-frequency resource.

20. The method of claim 17, wherein the RAR includes a field containing the time-frequency index.

* * * * *